UNITED STATES PATENT OFFICE.

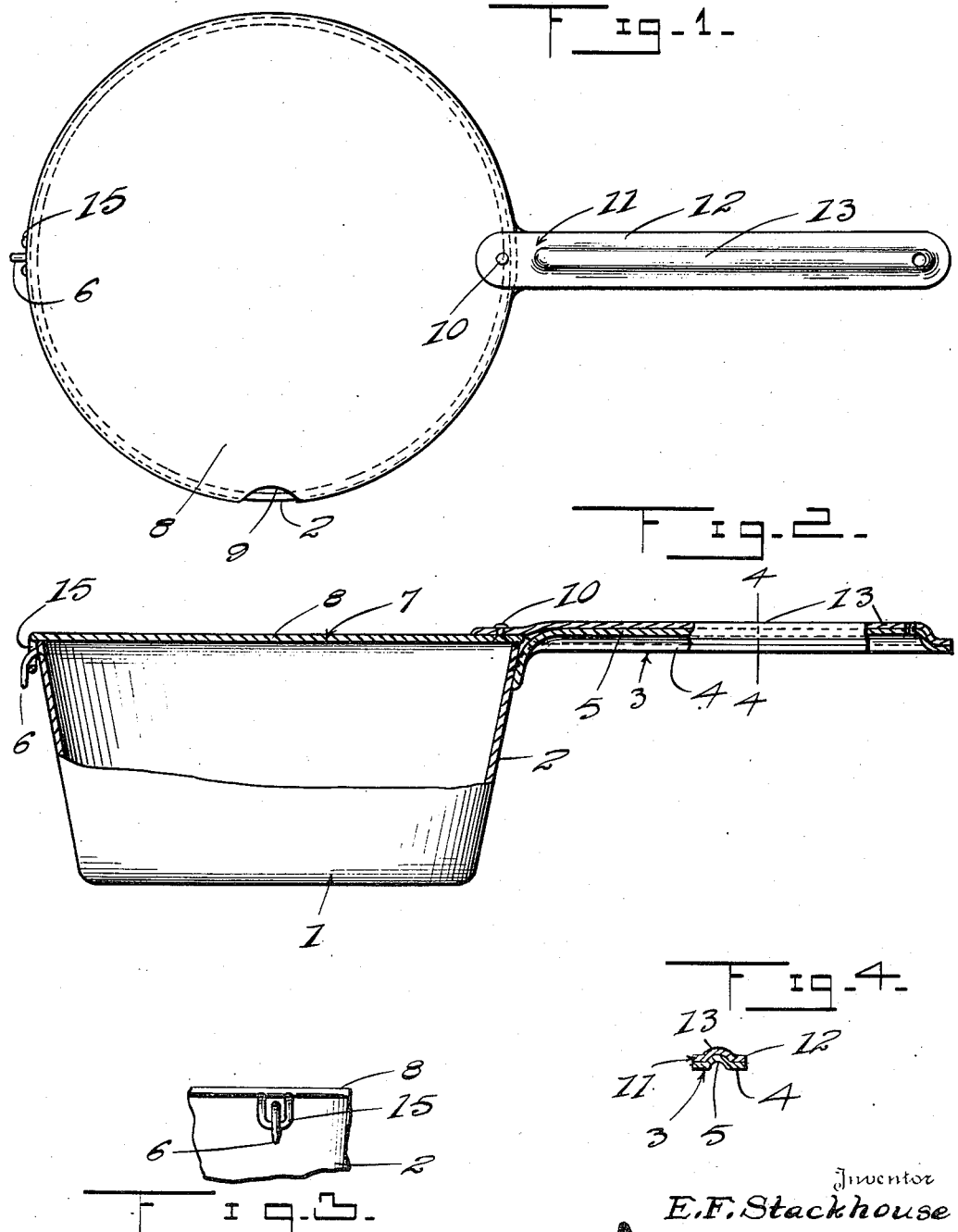

EMORY F. STACKHOUSE, OF KENSINGTON, OHIO.

PAN-COVER.

1,212,833.  Specification of Letters Patent.  Patented Jan. 16, 1917.

Application filed March 30, 1915. Serial No. 18,046.

*To all whom it may concern:*

Be it known that I, EMORY F. STACKHOUSE, a citizen of the United States, residing at Kensington, in the county of Columbiana and State of Ohio, have invented certain new and useful Improvements in Pan-Covers; and I do hereby declare the following to be a full, clear, and exact description of the invention, such as will enable others skilled in the art to which it appertains to make and use the same.

This invention relates to new and useful improvements in pan covers, and is particularly designed for use in draining the contents of stew pans after the cooking process.

An object of the invention is to provide a cover which will eliminate danger of scalding the person when it is desired to drain water or other liquid from the stew pan after articles have been boiled therein.

Another object of the invention is to provide a novel means for holding the cover in place to enable the pan to be inverted and still prevent the contents thereof from being removed.

A further object of the invention is to provide a novel means for centering the cover with relation to the pan.

With these and other objects in view, the invention consists in the novel combination and arrangement of parts which will be fully set forth in the following specification and accompanying drawings, in which, Figure 1 is a top plan view of a stew pan showing my improved cover applied thereto, Fig. 2 is a fragmentary, longitudinal, sectional view of Fig. 1, Fig. 3 is a fragmentary, detail view of the means for securing the cover to the front edge of the pan, and Fig. 4 is a transverse sectional view through the handle of the device, taken on the line 4—4 of Fig. 1.

Referring now to the drawings by characters of reference, the numeral 1 designates as an entirety a stew pan of the ordinary construction comprising a bottom and side walls 2. A suitable handle, designated generally by the numeral 3, is riveted or otherwise secured in any suitable manner to the side wall near its upper edge, and this handle 3 comprises the body 4, having the longitudinally extending upstanding rib 5 formed thereon. A suitable hook 6 is carried by the wall 2 at a point diametrically opposite the point to which the handle 3 is fixed, and this hook coöperates with a suitable staple, which will be more fully hereinafter described, in holding the lid in place.

The cover or lid is designated generally by the numeral 7 and comprises the body 8 which is preferably circular in plan and formed in its edge with a suitable recess 9 through which the liquid pours when the pan is being drained. Riveted or otherwise secured as at 10 to the body 8 near its periphery is the handle designated generally by the numeral 11, which comprises the body 12, having formed thereon the longitudinally extending, upstanding portion 13, which is preferably hollow to receive the upstanding portion 5 on the handle of the pan as clearly illustrated in Fig. 2. A suitable loop or staple 15 is secured to the lid or cover at a point diametrically opposite the handle 11 and is arranged to engage the hook 6 in order to hold the cover in place during the draining process.

It will be apparent from the foregoing that in use when the cover is in place, the loop 15 is passed over the hook 6 and the whole is then swung downwardly so that the handle 11 overlies and completely covers the handle 3 of the pan. When it is desired to drain the contents of the pan, the same is lifted by the handle and carried to the receptacle into which the liquid is poured and upon turning the pan so that the liquid will flow out through the opening 9, it will be evident that the lid will be firmly held in place as the handle is grasped in the hand of the user and the opposite end of the lid is prevented from being displaced by the hook and eye. In this way it will be evident that only one hand needs to be used in draining stew pans and danger of scalding the user is eliminated. It is also evident that the pan cover or lid will be centered as soon as it swings downwardly as the rib 5 engages in the upstanding portion 13 and assures the lid always swinging into the same position when in place on the pan.

While in the foregoing there has been shown and described the preferred embodiment of this invention, it is to be understood that such changes may be made in the combination and arrangement of parts as will fall within the spirit and scope of the invention as claimed.

What is claimed is:

In combination, a stew pan, a handle rigidly secured on the stew pan, a hook rigidly secured to said stew pan at a point diametrically opposite from said handle, said handle provided with a central longitudinal extending upstanding rib, which terminates short at each end of said handle, of a cover, said cover comprising a circular body, a recess formed in its peripheral edge, a handle rigidly secured to said circular body, a loop formed on the edge of said body at a point diametrically opposite from said handle, said loop adapted to engage the hook of the pan for holding said body in position, said handle of the cover provided with a central longitudinally extending rib which terminates short at each of its ends, said rib defining a groove which is adapted to receive the upstanding rib of the handle of the stew pan for fastening said cover on to said pan, said handle of the cover completely covering the handle of the stew pan and the portion on opposite sides of the central longitudinally extending rib of the cover handle resting upon the upper face of the portions extending on opposite sides of the upstanding longitudinally extending rib of the stew pan handle, thus preventing any lateral movement of the handle when clasped for moving the pan.

In testimony whereof I affix my signature in presence of two witnesses.

EMORY F. STACKHOUSE.

Witnesses:
 FRANK L. COX,
 H. F. MERRICK.